Aug. 3, 1954

V. J. BURNELLI ET AL 2,685,420

AIRPLANE WITH LIFTING FUSELAGE, LANDING
FLAPS, AND QUADRICYCLE LANDING GEAR

Filed Nov. 16, 1951

INVENTOR.
Vincent J. Burnelli
BY Hugh J. Knerr

Pech & Pech
ATTORNEYS

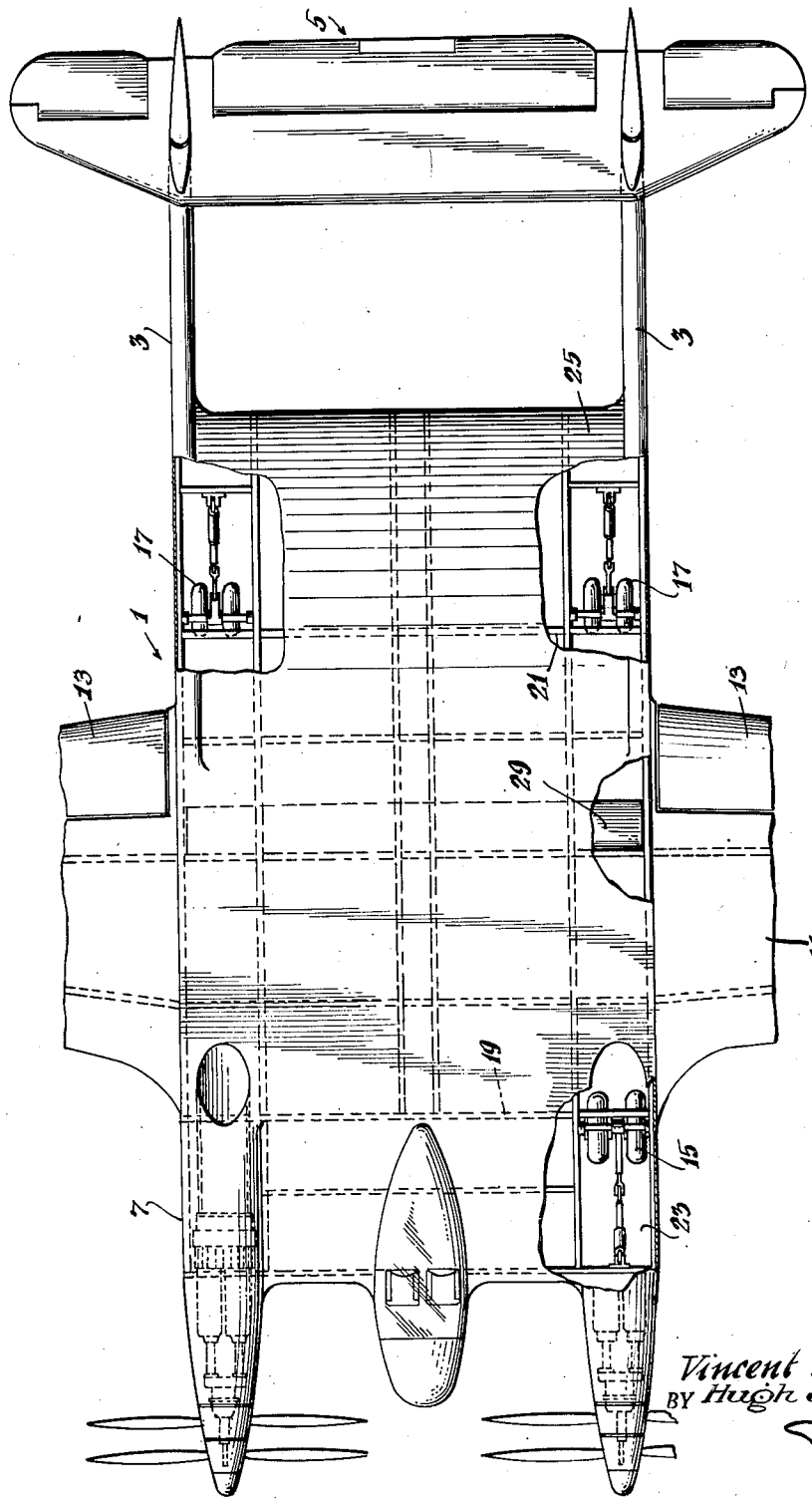

Patented Aug. 3, 1954

2,685,420

UNITED STATES PATENT OFFICE 2,685,420

AIRPLANE WITH LIFTING FUSELAGE, LANDING FLAPS, AND QUADRICYCLE LANDING GEAR

Vincent J. Burnelli, Great Neck, N. Y., and Hugh J. Knerr, Annapolis, Md.

Application November 16, 1951, Serial No. 256,673

4 Claims. (Cl. 244—13)

This invention is an improvement of the airplane disclosed in Patent 1,918,688 issued on July 18, 1933, to Vincent J. Burnelli, and relates broadly to the art of airplane landing gear arrangements, and in its more specific aspects it relates to a quadricycle landing gear which retains the advantages of the tricycle and conventional landing gear arrangements while eliminating the disadvantages which are inherent in both, and produces further advantages particularly when employed with an airplane having a wide airfoil body configuration or the lifting body type of design for which it is particularly well adapted: and the nature and objects of the invention will be readily recognized and understood by those skilled in the arts to which it relates in the light of the following explanation and detailed description of the accompanying drawings illustrating what we at present believe to be the preferred embodiments and mechanical expressions of our invention from among various other forms, arrangements, combinations and constructions, of which the invention is capable within the spirit and scope thereof.

The conventional type of landing gear provides two main wheels and a tail wheel and is generally conceded to have the following advantages:

(1) The main wheels of largest rolling radius and strength are ahead of the CG and lead in approaching rough or soft terrain for operating under emergency field conditions.

(2) Reduced weight by combining the tail wheel design leads with the tail group supporting structure and requiring reduced critical load design conditions.

(3) The rear door closer to the ground of advantage for loading facility.

The disadvantages which are inherent in the conventional landing gear are:

(A) Inadequate ground bearing support ahead of the CG to resist nosing over tendency due to maximum use of the brakes for stopping or wheel drag caused by soft ground or snow, especially at low speeds with small air pressure effect of the longitudinal control surface. This nosing over hazard is amplified with larger aircraft with greatly increased foreward extension of the body section and height from the ground.

(B) Directionally unstable during ground roll because the center of gravity is rearward of the point of main wheels and brake resistance, which tends to cause the airplane to swing to increase the turn and lead to a ground loop, therefore requiring more skilled and careful pilot attention.

(C) Undesirable cargo loading condition because the cargo floor is inclined in proportion to the angle of the wings in relation to the ground line necessary for high angle take-off attitude of approximately 10 degrees.

The following advantages are inherent in the tricycle type of landing gear:

(1) More directionally stable during ground roll because the center of gravity is ahead of the point of wheel drag and braking resistance.

This tends to keep the airplane moving in a straight line, thereby relieving the ground looping tendency which is inherent to the conventional type, and reducing the pilot skill and control attention under varied landing and take-off conditions.

(2) Level cargo floor because the airplane sets at about zero angle in stable ground support, desirable for best loading conditions and for improved pilot's taxying view.

(3) The lift of the wings is nullified during ground roll providing increased wheel traction for maximum effect of the brakes with nosing over protection provided by the nose wheel.

(4) Dynamic stability is improved in flight because the mass weight of the nose wheel and supporting structure far forward tends to counteract the offset rear weight of the tail group.

The tricycle type gear may be said to have the following disadvantages:

(A) The hazard of the dependence of the entire aircraft structure on a secondary element (the auxiliary nose wheel) to maintain ground stability with the main wheels rearward of the CG in contrast to the conventional type in which case failure of the tail wheels gear is of minor consequence.

(B) The smaller nose wheel of reduced rolling radius and bearing area leads into rough or soft terrain, and must withstand overload conditions due to high braking action especially necessary for blind instrument landing approach conditions.

(C) Increased weight of landing gear and forward body structure with amplified wing torsional loads which increases the torsional moment of the tractor engine mounts when heavy brake action is applied.

(D) Increased height of the rear door from the ground which is not desirable for best loading conditions.

We have provided a four wheel or quadricycle landing gear which maintains the favorable qualities outlined above while eliminating the unfavorable qualities we have set forth. We have devised a new disposition of the landing wheels which permits maximum use of the brakes in landing operations with lift nullification and permits level loading which is obviously a highly advantageous and desirable result. While level loading is desirable for passenger airplanes it will be appreciated that it is particularly effective for cargo airplane design.

The landing gear arrangement of this invention has been designed to distribute the load so that approximately 60% is on the front wheels and 40% on the rear wheels when the airplane is standing.

The landing gear arrangement embodied in this invention having been designed particularly though not necessarily for a Burnelli type airplane which provides an air foil section body having a large cargo compartment is designed so that the landing gear when retracted does not interfere with this large and useful load area. This is a highly important factor of our design for it will be appreciated that reduction of cargo space would be uneconomical and highly objectionable.

Our unique quadricycle landing gear provides an airplane with roadability and positive ground control generally similar to that required for heavy four wheeled road vehicles with braking action also provided for the rear trucks to cause the resultant braking loads to act close to the center of gravity, thereby reducing the tendency to swing into a turn which is an objection to the conventional type of landing gear. It is to be understood, as will be fully clarified hereinafter, that the included angle between a line extending from the point of contact of the front wheel with the ground and the center of gravity of the airplane and a vertical line extending through the center of gravity of the airplane is approximately 35 degrees, this being in contrast to 17 degrees for a conventional type with a tail wheel of low bearing area and ground pressure. This increase in the angle over conventional types practically eliminates the danger of nosing over.

Our invention is particularly effective with the lifting body airfoil section or Burnelli type airplane, for with the level ground attitude for lift reduction and the provision of a level cargo floor close to the ground, the aerodynamic effect of the airfoil section greatly increases the lift due to ground reaction during the take-off and landing run. It is this contributing effect of the airfoil section body which makes the combination of this type of body with the quadricycle landing gear highly advantageous and effective. For instance, the high ground reaction lift effect of an airfoil body section of thirty feet span which is about one-fourteenth of the body chord from the ground, creates high dynamic pressure which provides lift far in excess of normal lift requirements and tends to raise the airplane from the ground to relieve the high ground reaction pressure thereby automatically clearing the wheels of ground contact.

Another favorable factor flowing from the combination of a quadricycle landing gear with an airplane having a wide airfoil body configuration resides in the provision of the required width and space for the mounting and retraction of the four wheel trucks.

Referring to the high ground reaction lift effect of the airfoil body section in the take-off of the airplane, we have provided means for amplifying this ground reaction effect tending to raise the airplane wheels clear of the ground for pressure relief prior to the airplane reaching take-off flying velocity. The means we employ consists of a special type of airfoil body flap located in line with the rear wing spar bulkhead.

With the foregoing general objects, features and results in view, as well as certain others which will be apparent from the following explanation, the invention consists in certain novel features in design, construction, mounting and combination of elements, as will be more fully and particularly referred to and specified hereinafter.

Fig. 2 is a top plan view of the airplane, with parts thereof broken away.

Figure 1:
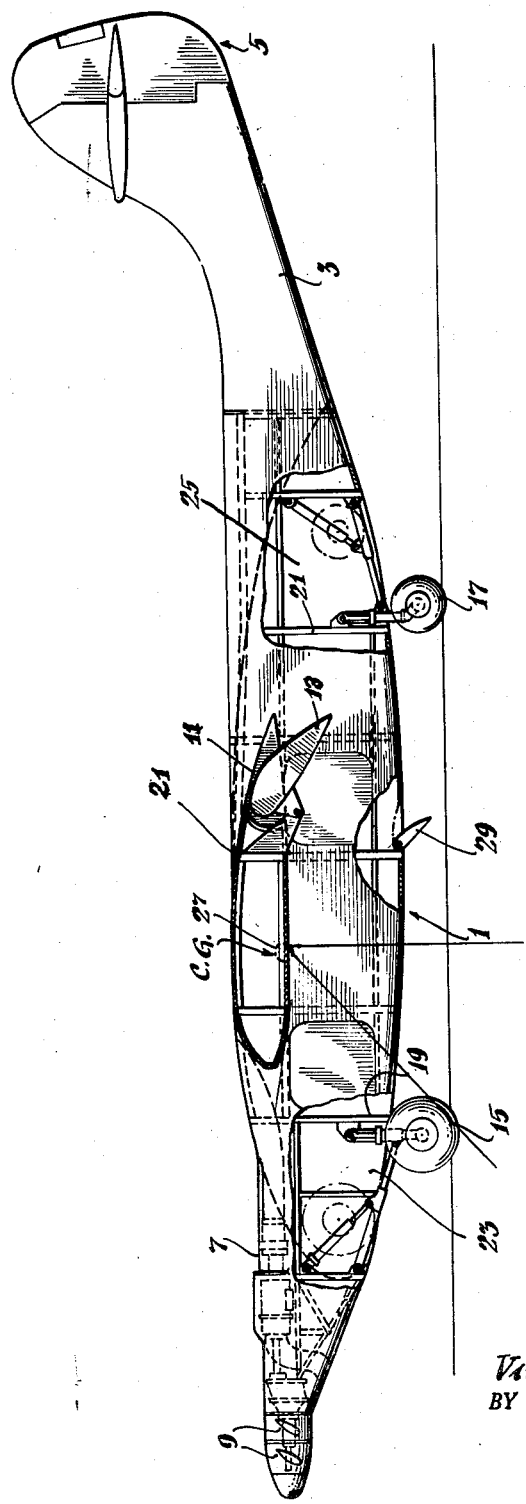
Fig. 1 is a view in side section of the airplane.

Referring to the accompanying drawings we have used the numeral 1 to designate the airfoil section body of the airplane. Booms 3 carry the tail group designated generally by the numeral 5. In order to provide a low cargo floor ground relation and level, the center of thrust, or engines, has been raised to provide the necessary ground clearance as will be apparent from consideration of Fig. 1 of the drawings where the engines are indicated by the numeral 7 and the propellers by the numeral 9. Outspanned wings 11 extend from the lifting body which due to its airfoil configuration provides a large useful load area producing an airplane of great economies from either a commercial or military standpoint and wing flaps 13 are provided. It is desirable to employ the high lift full span type of wing flap to provide the required angle of incidence for take-off and landing conditions. This permits setting the wing lift angle at about 12° for take-off and 25° for landing, in relation to the thrust or ground line.

The quadricycle landing gear comprises a pair of front trucks 15, each unit of which, in the disclosed example, consisting of a dual wheel assembly, one unit being mounted at one side of the fuselage and the other at the opposite side thereof. The front trucks 15 are mounted on and supported from the No. 1 bulkhead 19 and are operatively mounted in any suitable manner to retract forwardly into a compartment 23 which is forward of the cargo space of the airfoil body and, therefore do not interfere with or consume cargo space. The landing gear also includes a pair of rear trucks 17, which are similar to the front trucks and are mounted on No. 5 bulkhead 21 and retract rearwardly into a compartment 25 which is rearwardly of the cargo space, the main cargo space being that area between bulkheads 19 and 21. The landing gear is so mounted and constructed that when the airplane is at rest on the ground it is substantially level with the ground.

The rear trucks or wheels 17 constitute a main load gear, as contrasted with a conventional tail wheel. These rear wheels have two basic operating positions, securely locked or unlocked in swivel position. The rear wheels are always locked for the take-off and landings at which time the front wheels are operating semi-swivel or with less than full castering but sufficient angular change for steering. Suitable control means are provided for controlling the operation of the wheels.

In the particular embodiment of our invention which is illustrated in the drawings, which is one example thereof, we have indicated the center of gravity at 27. The included angle defined by the line a which extends between the point of contact of the front wheel and the center of gravity of the airplane and the line b which is a vertical line extending through the center of gravity of the airplane is approximately thirty-five degrees, this being in contrast to approximately seventeen degrees for a conventional type with a tail wheel of low bearing area and ground pressure. This greater bearing area and ground pressure of the quadricycle gear provides more uniform tractional qualities necessary for straight line rolling stability and positive steering control when the brakes are applied for cross wind operation.

As pointed out an airfoil body flap 29 is provided which spans the airfoil section in line with the rear wing spar bulkhead 21. This flap in extended position projects below the airfoil body section of the airplane and amplifies the ground reaction effect of the airfoil body in take-off by building up air pressure to clear the front of the airplane, and also augments the effects of the wing flaps 13.

On landing when making ground contact on the rear trucks the high ground lift reaction of the airfoil body section provides a beneficial high lift effect and being of gradual deceleration the nose will slowly lower and make cushioned contact on the forward trucks thereby stably supporting the airplane in level ground position and to employ full brake action during the landing roll.

It will be appreciated that the wide airfoil body employed for the Burnelli type of airplane is especially suited for the employment of the quadricycle landing gear arrangement of our invention. It permits maximum use of the brakes which are provided for the front and rear trucks and which are located fore and aft of the cargo or passenger section with no structural or wheel retraction interference.

We claim:

1. In an airplane in combination, an airfoil section fuselage, having outspanned wings, and a quadricycle landing gear for the airplane mounted on the airfoil section wherein the front wheels carry approximately 60% of the load when the airplane is standing and wherein the airplane assumes level ground attitude for level cargo floor when standing, high lift full span wing flaps mounted on said outspanned wings and a flap mounted on the airfoil section fuselage and extending the full width thereof and extensible to position below and under said fuselage to amplify the high ground reaction lift effect of said airfoil section fuselage which provides lift in take-off of the airplane to relieve the high ground reaction pressure.

2. In an airplane in combination, an airfoil section fuselage having outspanned wings, and a quadricycle landing gear for the airplane wherein the front wheels carry approximately 60 per cent of the load when the airplane is standing and wherein the airplane assumes level ground attitude for level cargo floor when standing, high lift wing flaps mounted on said outspanned wings and a flap mounted on the airfoil section fuselage forwardly of the rear wheel bearing points and extending the full width of said fuselage and extensible to position below and under said fuselage to amplify the high ground reaction lift effect of said airfoil section fuselage which provides lift in take-off of the airplane to relieve the high ground reaction pressure.

3. In an airplane in combination, an airfoil section fuselage having outspanned wings extending from the upper portion of said fuselage, and a quadricycle landing gear for the airplane mounted on the airfoil section fuselage, the front wheels being pivotally mounted on a forward bulkhead in said fuselage at points substantially upwardly spaced from the lower surface of said fuselage and the rear wheels being pivotally mounted on a rear bulkhead in said fuselage at points substantially upwardly spaced spaced from the lower surface of said fuselage and said wheels when in ground engaging airplane supporting position being closely adjacent the lower surface of said fuselage to provide a low hung airfoil section fuselage, wherein the airplane assumes level ground attitude for level cargo floor when standing, high lift full span wing flaps mounted on said outspanned wings and a flap mounted on the airfoil section fuselage forwardly of the rear wheel points of ground contact and extending the full width of said fuselage and extensible to position below and under said fuselage to amplify the high ground reaction lift effect of said airfoil section fuselage which provides lift in take-off of the airplane to relieve the high ground reaction pressure.

4. In an airplane in combination, an airfoil section fuselage having outspanned wings, and a quadricycle landing gear for the airplane wherein the included angle between a line extending between the point of contact of the front wheel with the ground and the center of gravity of the airplane and a vertical line extending through the center of gravity of the airplane is approximately 35 degrees, and wherein the airplane assumes level ground attitude for level cargo floor when standing, high lift wing flaps mounted on said outspanned wings and a flap mounted on and extending the full width of said airfoil section fuselage forwardly of the trailing edge thereof and extensible to position below said fuselage to amplify the high ground reaction lift effect of said airfoil section fuselage which provides lift in take off of the airplane to relieve the high ground reaction pressure.

References Cited in the file of this patent

UNITED STATES PATENTS

| Number | Name | Date |
|---|---|---|
| 1,503,297 | Calagans | July 29, 1924 |
| 1,998,487 | Burnelli | Apr. 23, 1935 |
| 2,224,641 | Burnelli | Dec. 10, 1940 |
| 2,380,290 | Burnelli | July 10, 1945 |
| 2,457,884 | Fulton | Jan. 4, 1949 |
| 2,472,947 | Hlobil | June 14, 1949 |
| 2,541,704 | Koppen | Feb. 13, 1951 |

FOREIGN PATENTS

| Number | Country | Date |
|---|---|---|
| 40,821 | Germany | Feb. 10, 1910 |
| 375,515 | Great Britain | June 30, 1932 |
| 871,291 | France | Jan. 10, 1942 |

OTHER REFERENCES

Aviation Week, Papers 16 and 17, September 11, 1950.